Figure 3:
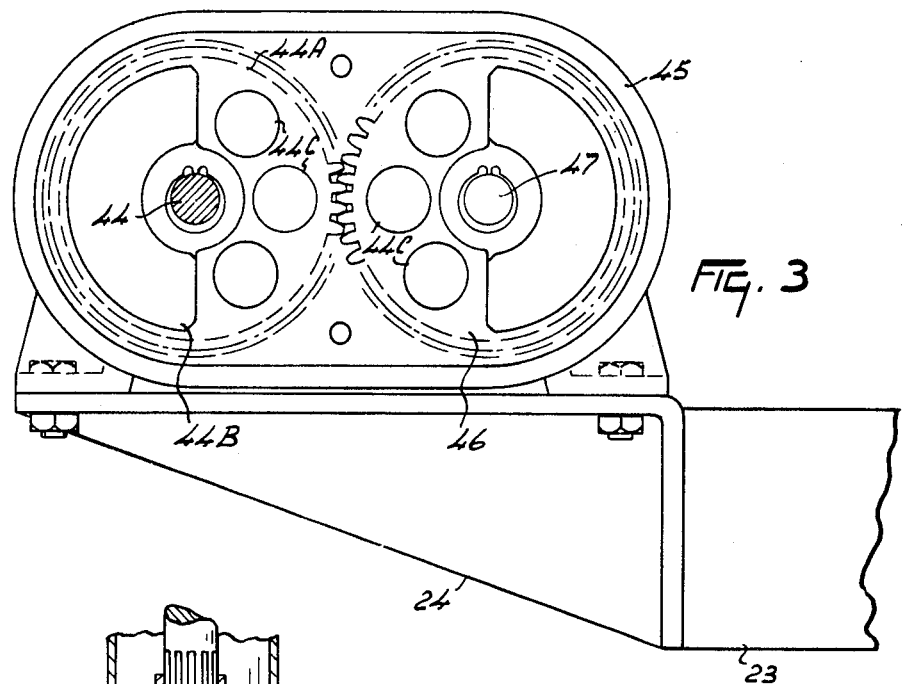

United States Patent [19]

van der Lely

[11] 4,191,258

[45] Mar. 4, 1980

[54] SOIL CULTIVATING IMPLEMENTS

[76] Inventor: Cornelis van der Lely, 7, Brüschenrain, Zug, Switzerland

[21] Appl. No.: 806,670

[22] Filed: Jun. 15, 1977

[30] Foreign Application Priority Data

Jun. 17, 1976, [NL] Netherlands ............... 7606554

[51] Int. Cl.² ............................................. A01B 27/00
[52] U.S. Cl. ........................................ 172/40; 172/63; 172/68; 172/149; 172/767
[58] Field of Search .................. 172/40, 47, 63, 68, 172/70, 76, 78, 80, 101, 118, 138, 146, 148, 200, 197, 150, 54, 199, 707, 708, 711, 719, 149, 177, 179, 395, 552, 685, 687, 688, 421, 173, 387, 389, 391, 145, 112, 767

[56] References Cited

U.S. PATENT DOCUMENTS

| | | | |
|---|---|---|---|
| 1,059,823 | 4/1913 | Boots | 172/197 |
| 1,458,655 | 6/1923 | Jahn | 172/118 X |
| 1,532,843 | 4/1925 | Stubbs | 172/40 UX |
| 2,871,959 | 2/1959 | Koskenmaki | 172/197 |
| 3,150,722 | 9/1964 | Tromm | 172/707 |
| 3,209,841 | 10/1965 | Lely et al. | 172/711 |
| 3,278,235 | 10/1966 | Bergstrom | 172/40 X |
| 3,396,804 | 8/1968 | Rogers | 172/40 |
| 3,504,598 | 4/1970 | Haker | 172/40 X |
| 3,774,689 | 11/1973 | Lely et al. | 172/112 |
| 3,951,213 | 4/1976 | Lely | 172/78 X |
| 3,960,219 | 1/1976 | Lely | 172/80 X |

FOREIGN PATENT DOCUMENTS 75522 2/1953 Denmark .................. 172/719

Primary Examiner—Paul E. Shapiro
Attorney, Agent, or Firm—Mason, Mason and Albright

[57] ABSTRACT

An implement attachable to the lifting links of a tractor has at least one, preferably two, rows of tines fixed to respective transverse frame beams. Between the rows of fixed tines, a supporting roller is pivoted to the frame. The roller can be adjusted relative to the frame to regulate the working depth of the first row of tines. An elongated soil working member is connected to the rear tined beam by a parallelogram linkage and a drive transmission, including at least one eccentric, is connected to upwardly extending support standards to reciprocate the working member in up and down directions so that lumps of soil are crumbled and levelled. The parallelogram linkage is resiliently connected or associated with the frame by opposing springs that permit reciprocal movements of the working member relative to the rear row of tines. The eccentric can be meshed pinions in a housing that are rotated by a drive shaft and each pinion weighted to be out of phase with the other by 180°. Various ground engaging bottoms can be detachably secured to a carrier depending on the soil condition and intended use.

28 Claims, 12 Drawing Figures

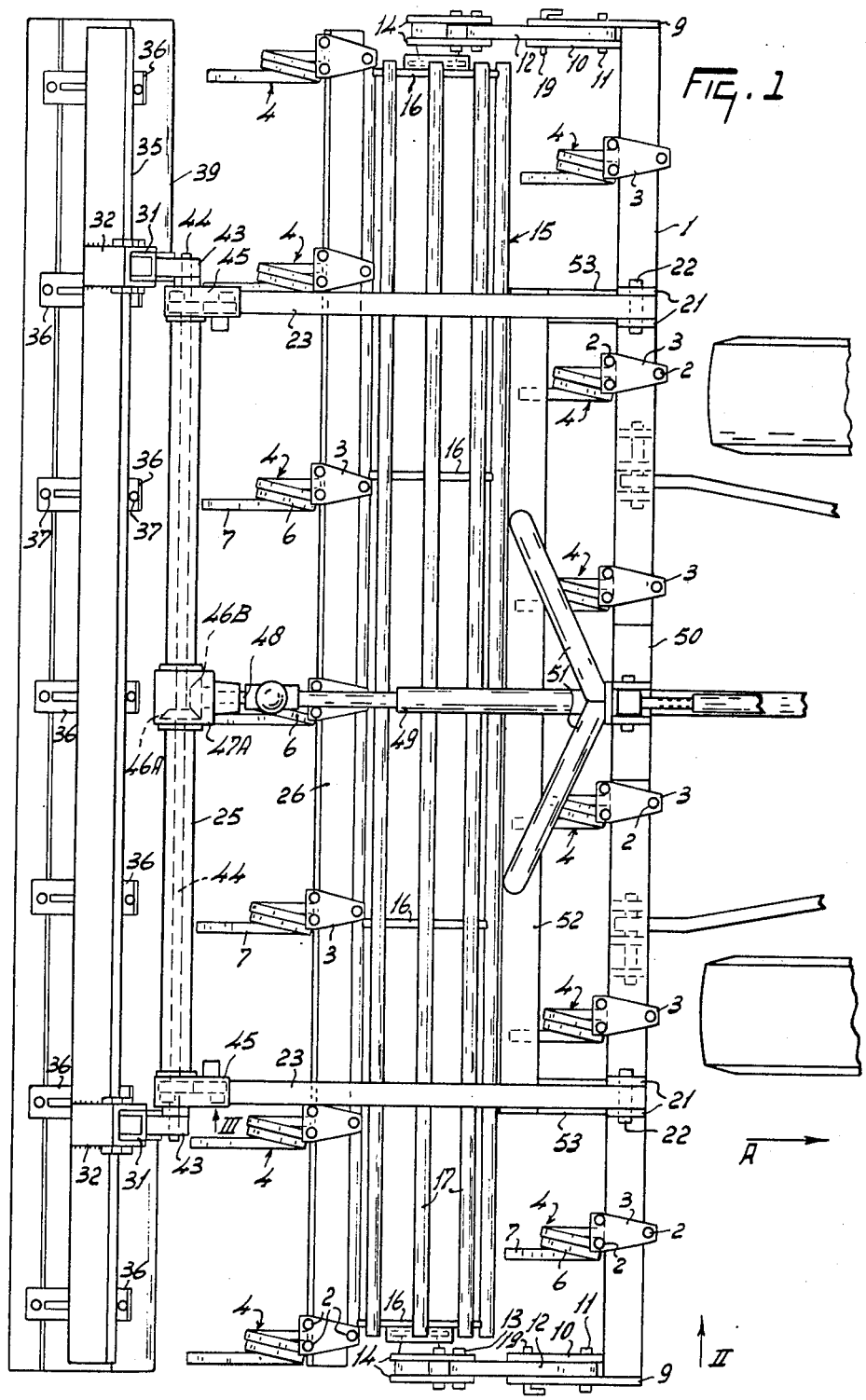

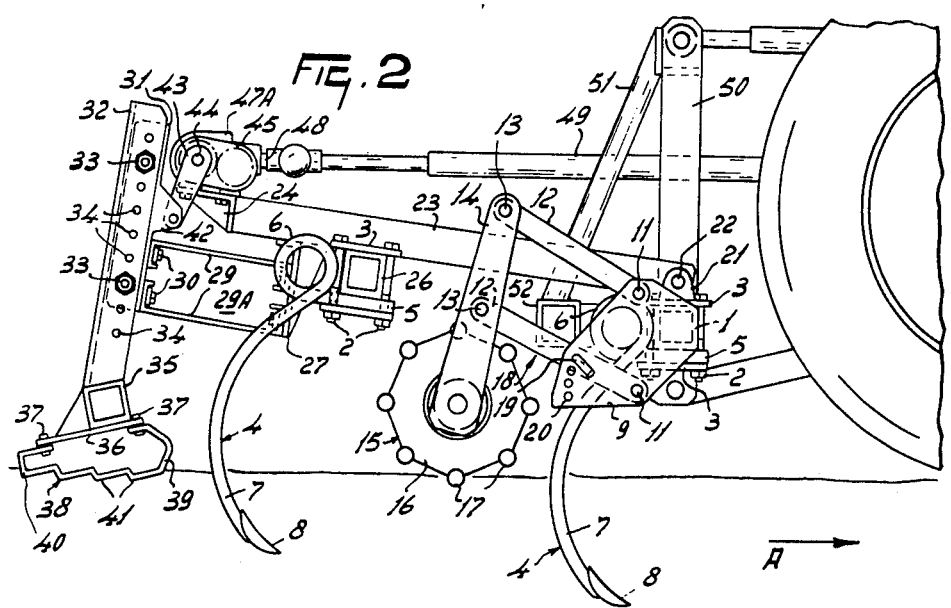
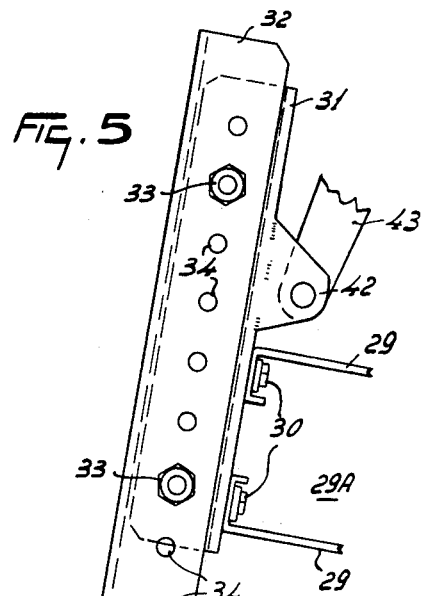
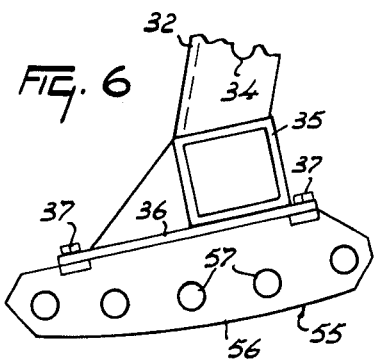
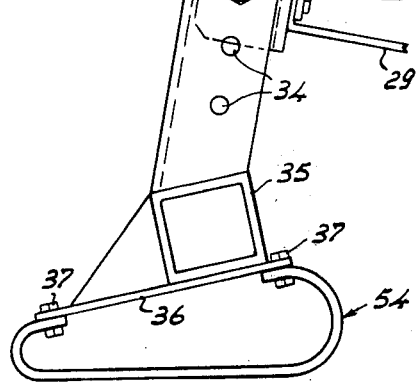
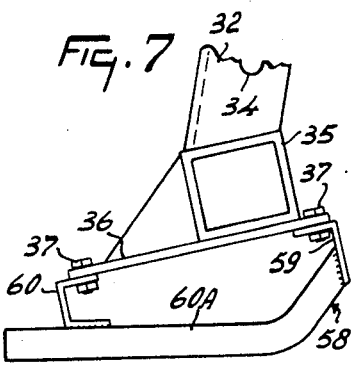

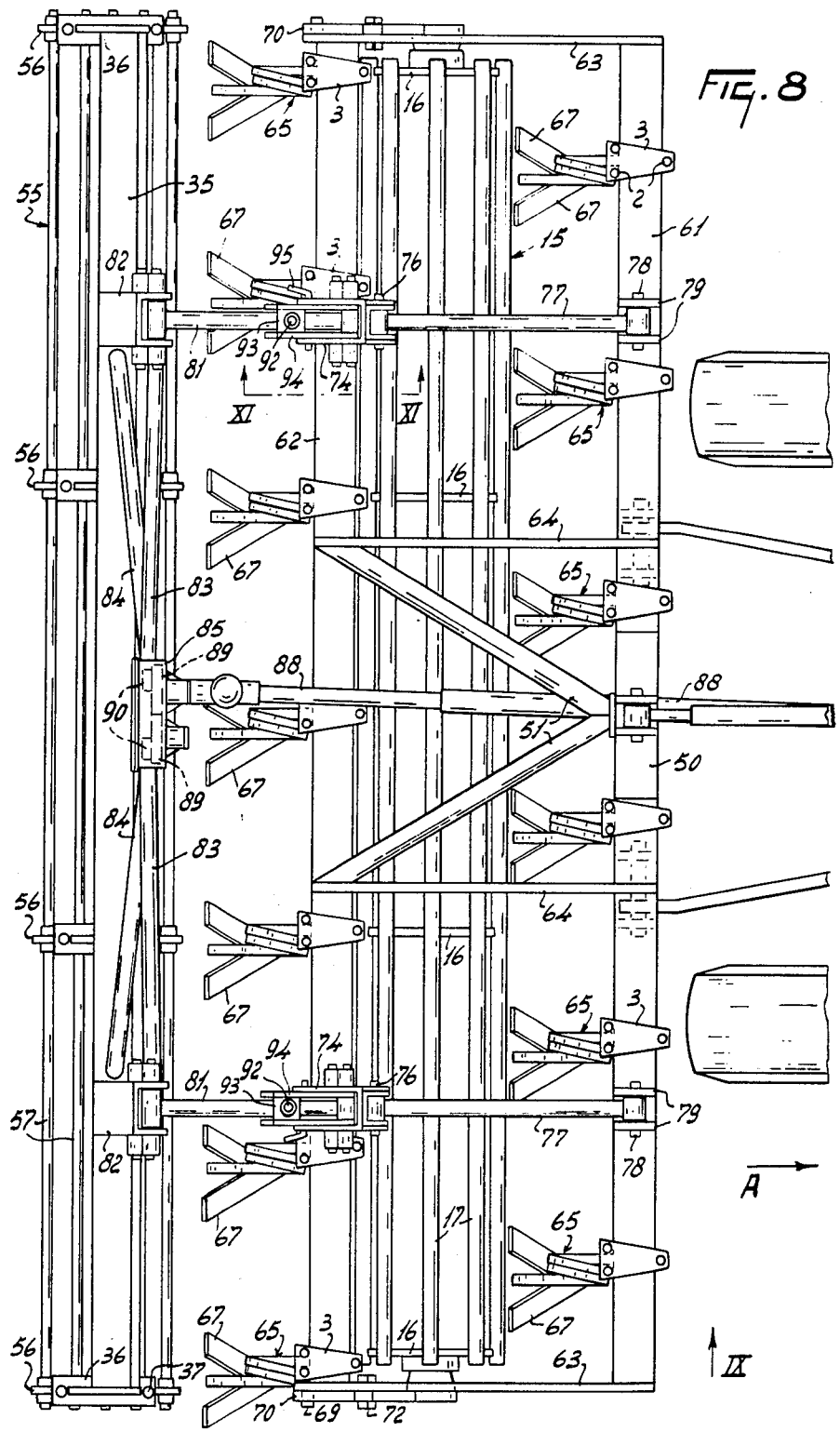

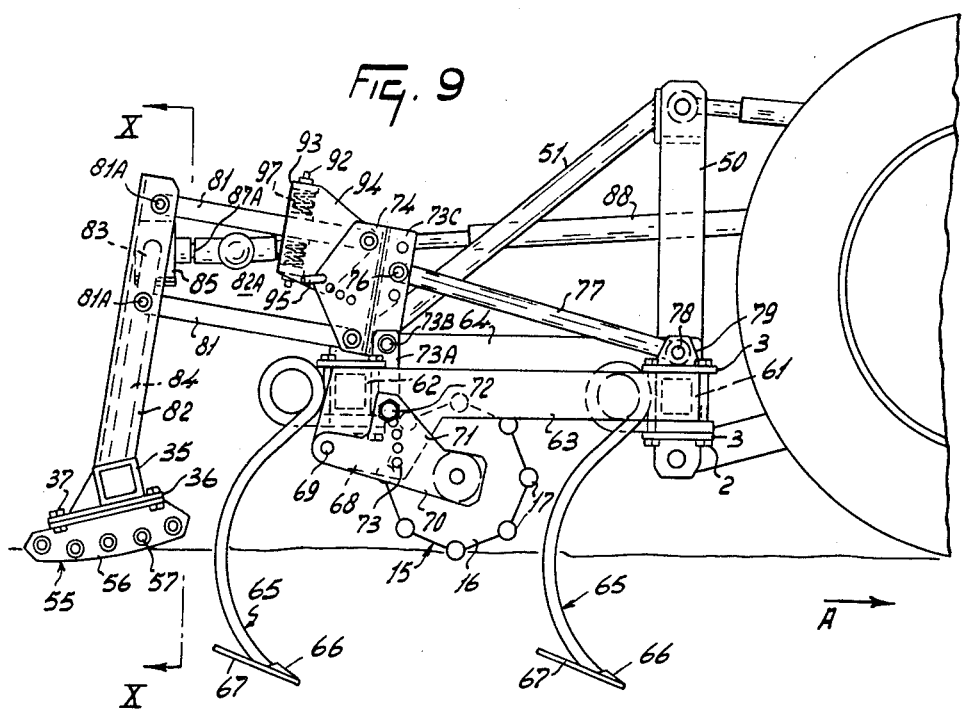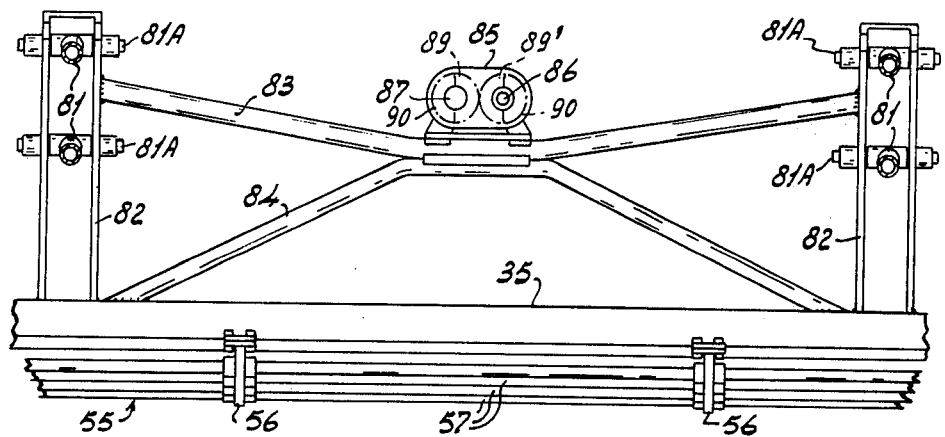

SOIL CULTIVATING IMPLEMENTS

According to one aspect of the invention, there is provided a soil cultivating implement of the kind set forth, wherein a row of said cultivator tools is movable through the soil during the use of the implement, the implement also comprising a rotary ground-engaging supporting member and a soil working member which is reciprocable, substantially only upwardly and downwardly, when the implement is in operation.

Figure 4:
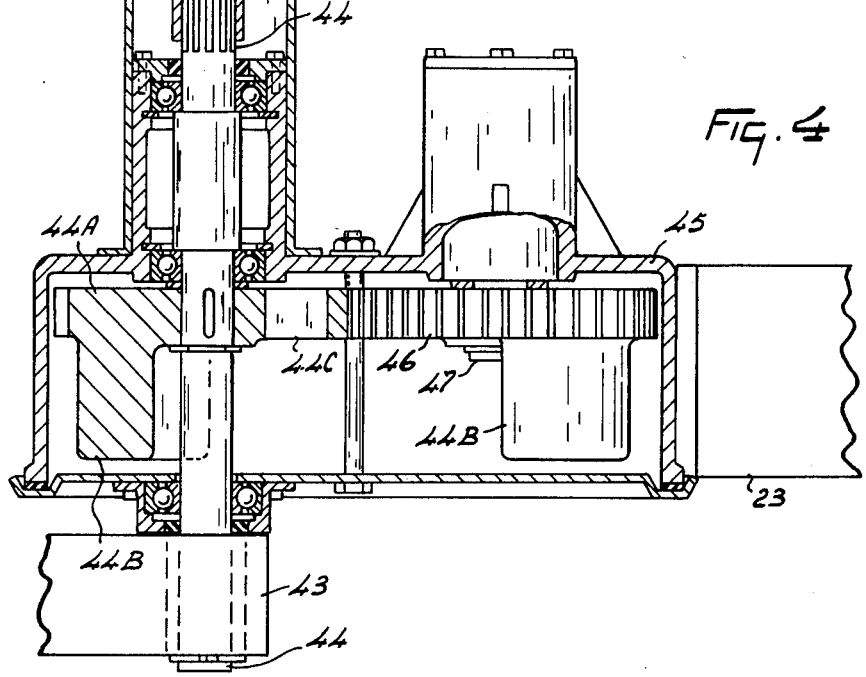
Figure 11:
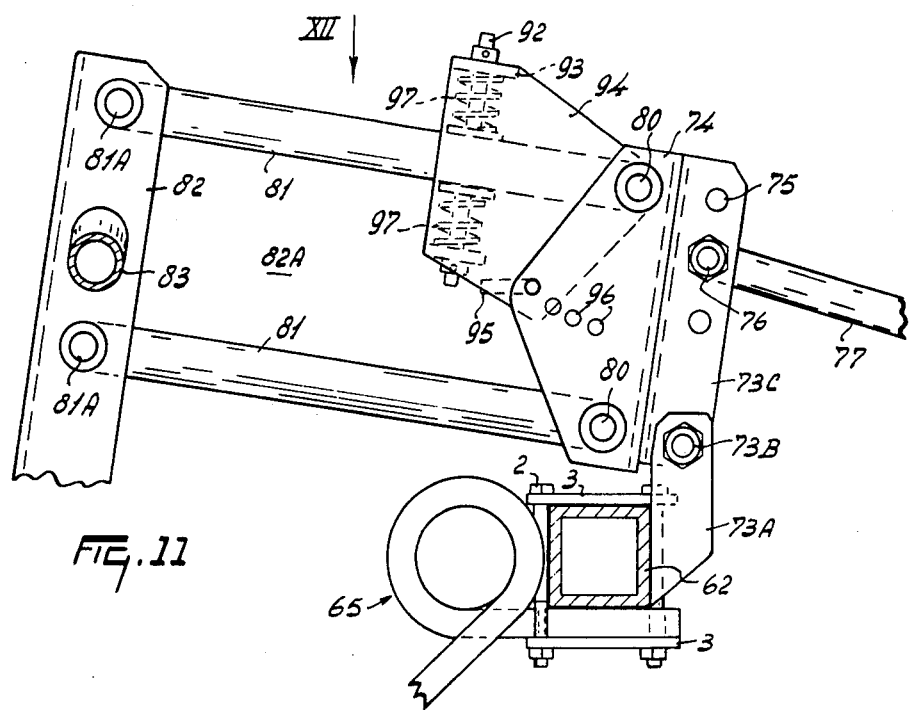
Figure 12:
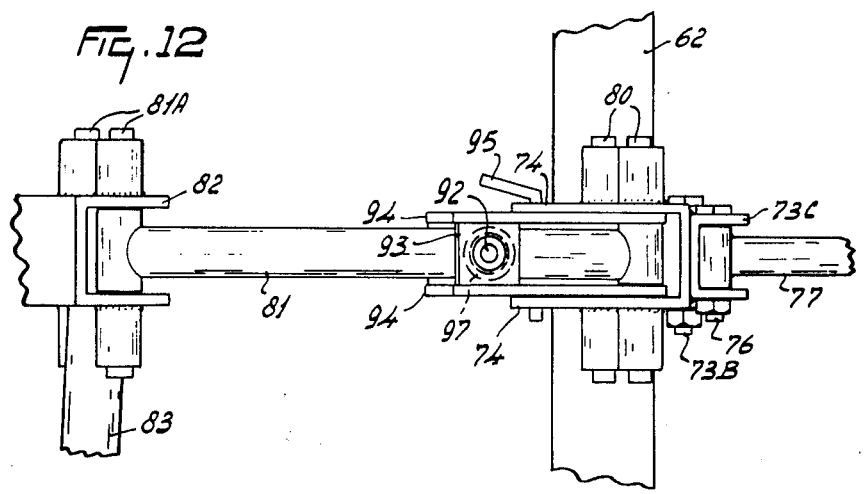

For a better understanding of the invention, and to show how the same may be carried into effect, reference will now be made, by way of example, to the accompanying drawings, in which:

FIG. 1 is a plan view of a soil cultivating implement or machine in accordance with the invention connected to the rear of an agricultural tractor, FIG. 2 is a side elevation as seen in the direction indicated by an arrow in FIG. 1, FIG. 3 is an elevation, to an enlarged scale, as seen in the direction indicated by an arrow III in FIG. 1 illustrating the construction and arrangement of an eccentric mechanism of the implement in greater detail, FIG. 4 is a sectional plan view corresponding to FIG. 3, FIGS. 5, 6 and 7 are side elevations, to an enlarged scale, showing alternative embodiments of part of the implement to an enlarged scale and in greater detail, FIG. 8 is a plan view illustrating an alternative form of soil cultivating implement or machine in accordance with the invention connected to the rear of an agricultural tractor, FIG. 9 is a side elevation as seen in the direction indicated by an arrow IX in FIG. 8, FIG. 10 is a section taken on the line X—X in FIG. 9, FIG. 11 is a section, to an enlarged scale, taken on the line XI—XI in FIG. 8, and FIG. 12 is a plan view as seen in the direction indicated by an arrow XII in FIG. 11.

Referring firstly to FIGS. 1 to 7 of the accompanying drawings, the soil cultivating implement or machine that is illustrated therein comprises a frame beam 1 that extends substantially horizontally transverse, and usually substantially horizontally perpendicular, to the intended direction of operative travel of the implement that is indicated by an arrow A in FIGS. 1 and 2 of the drawings and similarly in FIGS. 8 and 9 of the drawings in respect of the embodiment that will be described below. The beam 1 is of hollow formation and has a polygonal cross-section that it is preferred should be the square cross-section that can be seen in FIG. 2. When the beam 1 has this preferred square cross-section, it is arranged so that two sides thereof are substantially horizontally disposed whilst the other two sides are substantially vertically disposed. The beam 1 is provided at substantially regular intervals along its transverse length with cultivator tines that are generally indicated by the reference 4. Each cultivator tine 4 is maintained in its oppointed position by upper and lower substantially triangular clamping plates 3 that are interconnected by three upright bolts 2. Each cultivator tine 4 is formed from resilient material, such as spring steel, that is advantageously, as illustrated, of square or oblong cross-section. Each tine 4 commences with a horizontally or substantially horizontally disposed fastening portion 5 that is in parallel or substantially parallel relationship with the direction A, said portion 5 being securely clamped between the corresponding lower plate 3 and the lower surface of the frame beam 1 and being passed rearwardly, with respect to the direction A, between two of the respective group of three bolts 2. The rearmost end of the fastening portion 5 of each tine 4 with respect to the direction A merges integrally into a helical coil 6 which comprises substantially two complete 360° turns of the tine material. All or most of the coil 6 is at a higher horizontal level than the fastening portion 5 with which it is intergral and is located immediately behind the frame beam 1 with respect to the direction A. At the end of each coil 6 that is remote from the respective fastening portion 5, said coil merges into a downwardly directed shallow C-shaped soil working portion 7 (see FIG. 2), said portion 7 initially being directed downwardly and rearwardly with respect to the direction A at its upper end but, because of its curvature, being directed downwardly and forwardly relative to the same direction at its lower end. The lowermost ends of the portions 7 of the tines 4 have soil working blades 8 releasably secured to them, said blades 8 and their small fastenings (not shown) being the only parts of the tines 4 that are not of integral formation.

The opposite ends of the frame beam 1 are rigidly secured to corresponding substantially vertically disposed side plates 9 that are in parallel relationship with each other and substantially parallel relationship with the direction A. Each side plate 9 has the somewhat irregular shape that is illustrated for one of them in FIG. 2 of the drawings. Each side plate 9 is in parallel relationship with a further substantially vertical plate 10 that projects rearwardly with respect to the direction A from the frame beam 1 and that is spaced a very short distance inwardly along that frame beam from the side plate 9 concerned. Each pair of plates 9 and 10 is interconnected by upper and lower pivot pins 11 that are in parallel relationship with the length of the frame beam 1 and that are disposed vertically, or very nearly vertically, one above the other. The upper pivot pins 11 of the two pairs are in substantially horizontal alignment as are also the lower pivot pins 11 of the two pairs. Each pair of upper and lower pivot pins 11 have the leading ends of corresponding upper and lower arms 12 turnably mounted thereon between the respective plates 9 and 10. The rearmost ends, with respect to the direction A, of the upper and lower arms 12 of each pair are turnably connected to corresponding pairs of carriers 14 by upper and lower pivot pins 13 that are in parallel relationship with the pivot pins 11. The two carriers 14 of each pair project downwardly towards the ground surface from beneath the respective lower pivot pin 13, it being apparent from FIG. 2 of the drawings that the width of each carrier 14 in the direction A becomes gradually greater from the upper to the lower end thereof. A supporting member that is in the form of an open ground roller 15 is mounted between the lowermost ends of the two pairs of carriers 14 so as to be freely rotatable about a substantially horizontal axis that is in substantially parallel relationship with the frame beam 1 and the pivot pins 11 and 13. Rotary bearings co-operate with substantially vertically disposed and substantially octagonally shaped support plates 16 of the roller 15, the support plates 16 in question being those at the opposite ends of said roller but there being further similarly shaped support plates 16 that do not co-operate with said bearings located at regularly spaced apart intervals along the axial length of the roller. The corners of the regular octagonally shaped support plates 16 are interconnected by eight tubes or bars 17 that extend parallel or substantially parallel to each other and to the axis of rotation of the roller 15 throughout the axial length of that roller, said tubes or bars 17 being spaced apart from one another at regular 45° intervals around the axis of rotation of the roller 15 and said support plates 16 being interconnected only by the peripherally disposed tubes or bars 17 and not by any axially positioned part.

It will be apparent from FIG. 2, in particular, of the drawings that the supporting roller 15 is indirectly connected to the frame beam 1 by a dual pivotable linkage 18 that is not, in fact, a true parallelogram linkage but that varies only a little from true parallelism, the lower arms 12 being a little greater in length than the upper arms 12. The dual parallelogram linkage 18 can be retained in any chosen one of a number of different angular positions by two horizontal locking pins 19. The pairs of plates 9 and 10 are formed with a number of horizontally aligned pairs of holes 20 that are spaced apart by equal distances from the axis defined by the lower pivot pins 11 and each of the two lower arms 12 is formed with a single hole that is at the same distance from said axis. The locking pins 19 can thus be used to retain the holes in the lower arms 12 in register with chosen pairs of the holes 20 and the particular pairs of holes 20 that are used determine the level of the axis of rotation of the roller 15 relative to the level of the frame beam 1. FIG. 2 of the drawings shows the axis of rotation of the roller 15 maintained at the highest level relative to the frame beam 1 which it is capable of adopting.

Two pairs of upright lugs 21 are mounted on the upper surface of the frame beam 1 at equal distances inwardly from the opposite ends of that frame beam, said distances preferably being, as illustrated, equal to approximately one-quarter of the total transverse length of the frame beam 1. Each pair of lugs 21 supports a corresponding horizontal pivot pin 22 that is in parallel relationship with the length of the frame beam 1, the two spaced pivot pins 22 being in coaxial relationship. The leading ends of arms 23 are turnably connected to the frame beam 1, between the two lugs 21 of each pair, by the respective pivot pins 22, said arms 23 extending rearwardly with respect to the direction A over the top of the roller 15 to carry supporting brackets 24 at their rearmost ends. A tube 25 that is in parallel relationship with the frame beam 1 rigidly interconnects the two supporting brackets 24. A second frame beam 26 of substantially the same axial length as the frame beam 1 is carried by the lower surfaces of the two arms 23 so as to be in parallel or substantially parallel relationship with said frame beam 1, the second frame beam 26 making junctions with the two arms 23 at locations between the midpoints of those arms 23 and their rearmost ends having regard to the lengths of the arms 23 in the direction A. The second frame beam 26 is preferably of the same formation and cross-sectional shape as the frame beam 1 and thus, in the embodiment that is being described, has a hollow formation and square cross-section. Two of the sides of the second frame beam 26 are approximately horizontally disposed while the other two sides are approximately vertically disposed. The second frame beam 26, like the frame beam 1, has a plurality of the cultivator tines 4 firmly clamped to its lower surface by more of the plates 3 and upright bolts 2. It will be noted that, as seen from the rear in the direction A, the cultivator tines 4 that correspond to the leading frame beam 1 are located alternately midway between the cultivator tines 4 that correspond to the second and rear frame beam 26, the leading frame beam 1 being provided, in the embodiment that is being described, with six of the cultivator tines 4 while the second and rear frame beam 26 has seven of those cultivator tines. Each arm 23 is provided, immediately to the rear of the second frame beam 26, with a corresponding downwardly extending support 27, the supports 27 having the leading bent-over ends of corresponding upper and lower leaf springs 29 firmly but releasably secured to them by bolts. The upper and lower leaf springs 29 project rearwardly from the supports 27 and their opposite ends are bent over and are secured by bolts 30 to corresponding support plates 31, the bolts 30 being in substantially symmetrically opposed relationship with the unreferenced bolts by which the leading ends of the springs 29 are secured to the depending supports 27. The two support plates 31 are of channel-shaped cross-section (see FIG. 1) and the bolts 30 secure the rear bent-over ends of the leaf springs 29 to the webs or bases of said plates. The construction and arrangement of the two pairs of upper and lower leaf springs 29 is such that they form, with the downwardly extending supports 27 and the support plates 31, a dual resilient parallelogram linkage 29A. The two channel-shaped support plates 31 are arranged so that they extend obliquely upwardly and forwardly with respect to the direction A at a few degrees to the vertical, each support plate 31 having its two parallel limbs orientated rearwardly with respect to the direction A from the web or base thereof. Said two limbs are embraced by those of a corresponding channel-shaped support plate 32 that is of larger cross sectional shape than the co-operating plate 31, the two support plates 32 being disposed with their webs or bases rearmost with respect to the direction A and their limbs projecting forwardly therefrom in substantially the direction A. Thus, each channel-shaped support plate 32 extends obliquely upwardly and forwardly with respect to the direction A from bottom to top at the same few degrees to the vertical as the respective co-operating support plate 31. The limbs of each channel-shaped support plate 31 and those of each channel-shaped support plate 32 are formed with rows of regularly spaced apart horizontally aligned holes 34 and pairs of upper and lower bolts 33 can be entered through chosen registering pairs of the holes 34, after sliding the support plates 32 axially relative to the support plates 31, to retain the plates 32 in chosen positions of downward extension from the lower ends of the support plates 31.

The lowermost ends of the two channel-shaped support plates 32 that project downwardly beyond the support plates 31 are secured to the top of a carrier 35 that extends substantially horizontally parallel to the frame beam 1 and second frame beam 26 throughout substantially the same path of travel as those two frame beams. As can be seen in FIG. 2 of the drawings, the carrier 35 is of hollow formation and polygonal cross-section and is preferably formed from the same square cross-section metallic material as are the two frame beams 1 and 26. However, with the preferred square cross-section that is illustrated, the carrier 35 is not arranged with its upper and lower surfaces substantially horizontal but with those surfaces in oblique relationship with the horizontal whereby the leading edges thereof are at higher vertical levels than are the respective rear edges thereof. The bottom of the carrier 35 has an elongate soil working member 38 releasably secured to it, said soil working member 38 extending throughout the working width of the foregoing cultivator tines 4 (see FIG. 1). A plurality, such as seven, of strip-shaped supports 36 are fixedly secured to the lower surface of the carrier 35 at regular intervals along the length of that carrier, each support 26 projecting a considerable distance rearwardly from the carrier 35 and by a very short distance forwardly beyond that carrier, the ratio between the lengths of these projections preferably being not less than substantially 4:1. Bolts 37 at the leading and rearmost ends of the strip-shaped supports 36 firmly but releasably secure the principal soil-contacting portion of the elongate soil working member 38 to said strips 36 and thus indirectly to the carrier 35.

The principal soil-contacting portion of the elongate member 38 is formed from bent sheet metal or other sheet material. Said portion has a front 39 and a rear 40, both with respect to the direction A, the front 39 having a significantly greater vertical extent than does the rear 40. The front initially extends downwardly and forwardly with respect to the direction A from its connection by the leading bolts 37 to the supports 36 but is bent over sharply to extend downwardly and rearwardly with respect to the same direction to the bottom of the member 38. The rear 40 of said soil-contacting portion of the member 38 is, as will be seen in FIG. 2 of the drawings, of substantially channel-shaped cross-section. The front and rear 39 and 40 are interconnected by a portion of approximately saw-toothed cross-section which portion exhibits three downwardly directed parallel ribs 41 that are spaced apart from one another at substantially equal intervals in the direction A.

Each of the two channel-shaped support plates 31 is provided, immediately above the corresponding upper leaf spring 29, with a pair of forwardly projecting lugs 42 and said lugs are connected, by horizontal pivots, to the lower ends of arms 43 that engage said pivots between the two lugs 42 of each pair. The opposite ends of the arms 43 are turnably mounted at the opposite ends of a substantially horizontal shaft 44 which extends axially through the tube 25 to project beyond that tube at both ends. This arrangement can be seen in FIGS. 1 and 4 of the drawings from which latter Figure it will be apparent that, in practice, the shaft 44 is not of unitary construction but is formed in three or more portions having externally splined ends that are interconnected by internally splined sleeves. The projecting end portions of the portions 44 lie in two housings 45 which housings are connected to the opposite ends of the tube and are bolted or otherwise releasably to the respective brackets 24 at the rearmost ends of the two arms 23 (see FIG. 3). The portions 44 are rotatably journalled in spaced ball bearings (FIG. 4) at the ends of the tube 25 and in the housings 45 and are provided, inside those housings, with corresponding toothed pinions 44A. Each pinion 44A has its teeth in driving mesh with those of a neighbouring pinion 46 that is of the same size, said pinions 46 being rotatably mounted on stub shafts 47 in the two housings 45. Each of the two pinions 44A and 46 in each housing 45 is provided at one side of the corresponding portion 44 or 47 with an eccentric weight 44B that substends 180° at the longitudinal axis of the respective shaft and at the other side of that shaft is lightened by the formation of a plurality, such as three, of holes 44C. It will be remembered that the two pinions 44A and 46 in each housing 45 are of the same size and it will be seen from FIG. 3 of the drawings that they are so arranged as to be 180° out of phase with each other around the corresponding shafts 44 and 47.

The tube 25 includes, substantially midway along its length, a gear box 47A in which gear box the shaft 44 carries a bevel pinion 46A. The bevel pinion 46A has its teeth in driven mesh with those of a further bevel pinion 46B that is secured to a rotary input shaft 48 of the gear box that projects forwardly from the front thereof in substantially parallel relationship with the direction A. In the use of the soil cultivating implement, the leading forwardly splined or otherwise keyed end of the rotary input shaft 48 of the gear box 47A is placed in driven connection with the rear power take-off shaft of an agricultural tractor or other operating vehicle by way of an intermediate telescopic transmission shaft 49 that is of a construction which is known per se having universal joints at its opposite ends. A central region of the leading frame beam 1 of the implement is provided with a coupling member or trestle 50 that comprises two lower horizontally spaced apart coupling points for connection to the free ends of the lower lifting links of a three-point lifting device or hitch and a single upper coupling point for connection to the adjustable length upper lifting link of said three-point lifting device or hitch. Two strengthening tie beams 51 diverge downwardly and rearwardly with respect to the direction A from the upper coupling point of the coupling member or trestle 50 and have their lower and rearmost ends rigidly secured to the top of a beam 52. The beam 52 is arranged at a short distance rearwardly of the beam 1 with respect to the direction A and at the same horizontal level as the beam 1. It is in parallel relationship with the beam 1 but has a shorter axial length than that beam, the opposite ends thereof being located substantially vertically beneath, as seen in plan view, (FIG. 1), the two arms 23. The opposite ends of the beam 52 are rigidly connected to the beam 1 by two supports 53 that both extend substantially horizontally parallel to the direction A through the short distance which separates the beam 52 from the beam 1. Preferably, for the sake of economy and convenience, both the beam 52 and the supports 53 are formed from the same hollow metallic material of square cross-section that advantageously affords the frame beam 1, the second frame beam 26 and the carrier 35. The two supports 53 are located immediately beneath leading end regions of the two arms 23 and, together with the opposite ends of the beam 52, afford stops which prevent the arms 23 from turning downwardly about the axis defined by the pivot pins 22 beyond positions of abutment with those stops. The arrangement is, in fact, such that, when the lower surfaces of the two arms 23 are in downwardly abutting engagement with the stops that are defined by the parts 53 and 52, the working depth of the rear row of cultivator tines 4 will be the same, or substantially the same, as the working depth of the leading row of such tines.

In the use of the soil cultivating implement or machine that has so far been described with reference to FIGS. 1 to 4 of the drawings, the coupling points of its coupling member or trestle 50 are connected to the rearmounted three-point lifting device or hitch of an agricultural tractor or other operating vehicle as shown in FIGS. 1 and 2 of the drawings and the rotary input shaft 48 of the gear box 47A is placed in driven connection with the rear power take-off shaft of the same tractor or other vehicle by way of the known intermediate telescopic transmission shaft 49 which has universal joints at its opposite ends. The maximum depth to which the cultivator tines 4 that are carried by the leading frame beam 1 can penetrate into the subsoil can, if required, be adjusted before work commences by changing the angularity of the dual pivotable linkage 18, engaging the locking pins 19 in alternative pairs of the holes 20. This, as discussed above, retains the axis of rotation of the roller 15 at a different level relative to that of the frame beam 1. The roller 15 is located between the two rows of cultivator tines 4 with respect to the direction A, the rear row of tines 4 occupying, during operation, a position generally equivalent to that which is illustrated in FIG. 2 of the drawings in which position the lower ends of the soil working portions 7 of the tines 4 and their blades tend strongly to penetrate more deeply into the soil as a result of continued progress in the direction A. The elongate soil working member 38 that is indirectly connected to the second frame beam 26 by the dual resilient parallelogram linkage 29A is urged downwardly into contact with substantially only the surface of the strip of soil that has been worked by the two foregoing rows of tines 4. The soil working memeber 38 is caused to perform an upward and downward vibratory reciprocation during forward progress in the direction A as the result of the rotary drive that is imparted to the shaft 44 from the power take-off shaft of the operating tractor or other vehicle.

The opposite ends of the shaft 44 drive the eccentrically weighted pinions 44A and 46 that afford eccentric mechanisms of the implement. The two mechanisms at the opposits ends of the shaft 4 are, of course, in phase with one another and it has previously been stated that, as seen in FIGS. 3 and 4 of the drawings in respect of one of those mechanisms, the eccentric weights 44B that are carried by the two pinions 44A and 46 are 180° out of phase with each other around the axes of the corresponding shafts 44 and 47. This relationship is, of course, only true in the particular position that is illustrated in FIGS. 3 and 4 of the drawings and in a further position in which both pinions 44A and 46 have revolved through exactly 180° around the axes of the corresponding shafts 44 and 47. The effect of the arrangement is that the horizontal components of the rotary movements of the centers of gravity of the two eccentrically weighted and eccentrically apertured pinions 44A and 46 of each eccentric mechanism around the axes of the shaft 44 and respective shaft 47 counterbalance one another whereas the vertical components thereof augment one another. Thus, during operation of the implement, the reciprocatory vibration that is caused by the two eccentric mechanisms take place substantially only in substantially vertical directions. It will be seen from FIG. 2 of the drawings that the two eccentric mechanisms are tilted to some extent so that, in many cases, the reciprocatory vibration will have a very small component that acts in horizontal directions.

When the implement is adjusted to produce a relatively large working depth of the cultivator tines 4, the force by which those tines are drawn downwardly into the soil as the result of continued progress in the direction A increases. The elongate soil working member 38 is thus pressed more heavily against the ground surface, it being remembered that said member 38 can be displaced upwardly or downwardly to any chosen one of a number of different levels by temporarily removing the bolts 33, sliding the two channel-shaped support plates 31 and 32 lengthwise relative to one another and replacing the bolts 33 in freshly registering holes 34. Generally speaking, the greater the pressure by which the member 38 bears against the ground surface, the greater will be its crumbling effect upon coarse lumps of soil left upon the ground surface by the foregoing cultivator tines 4. Since an increased working depth of the tines 4 tends to produce more such coarse lumps of soil, the proportionally increased crushing effect of the member 38 compensates automatically therefor. It will be apparent that the mainly upwardly and downwardly orientated reciprocatory vibration of the rotating shaft 44 that is caused by the two co-operating eccentric mechanisms is transmitted to the parts 31, 32, 35, 36 and 37 by the arms 43, the dual resilient parallelogram linkage 29A being continually flexed upwardly and downwardly and always tending to restore an equilibrium position that will depend upon a number of variable factors, particularly the position of bodily adjustment of the roller 15 that has been chosen relative to the frame beam 1 and the positions of downward extension of the support plates 32 that have been adopted beyond the support plates 31. The upward and downward vibratory movement of the member 38 is amplified by the provision of the dual resilient parallelogram linkage 29A. Since the two eccentric mechanisms are mounted on the brackets 24 carried at the rear ends of the arms 23, the operation of said mechanisms will cause some upward and downward vibratory movement of the arms 23 about the axis defined by the pivot pins 22. In addition, the leaf springs 29 of the linkage 29A interconnect the support plates 31 and the downwardly extending supports 27 which depend from the arms 23. Thus, during operation, the rear row of cultivator tines 4 is also caused to reciprocate upwardly and downwardly although, usually, to a lesser extent than the member 38. This vibratory movement of the rear cultivator tines 4 generally improves their effect upon the soil.

The elongate soil working member 38 of FIGS. 1 to 4 of the drawings can, if desired, be replaced by one of the alternative soil working members that are illustrated in FIGS. 5, 6 and 7 of the drawings. It will be noted that each of these alternative soil working members is releasably connected to the strip-shaped supports 36, in the same way as the member 38, by the bolts 37. FIG. 5 illustrates the use of an elongate soil working member 54 that once again is formed from sheet metal or other sheet material. The front and rear of the member 54, with respect to the direction A, have the same height as the front 39 and rear 40 of the elongate soil working member 38 but, in this case, said front and rear are both of uniform cylindrically curved configuration and do not exhibit any sharp bends. The lowermost extremities of the front and rear merge smoothly into a completely flat soil-contacting bottom of the member 53. FIG. 6 illustrates the employment of an elongate soil working member 55 which comprises a plurality of vertical support plates 56 that extend parallel to one another and substantially parallel to the direction A, said plates 56 being spaced apart from one another at substantially regular intervals across the working width of the member 55. It will be noted from comparing FIG. 6 with FIGS. 2 and 5 of the drawings that, despite having a rather different construction, the member 55 has much the same general shape as the members 38 and 54 when seen in side elevation. The support plates 56 are interconnected by a plurality, such as five, of rods or tubes 57 that all extend substantially horizontally perpendicular to the direction A at regularly spaced apart intervals from one another. The rods or tubes 57 are all of circular cross-section and an imagin-ary curved surface which contains all of their longitudinal axes in directed upwardly and forwardly with respect to the direction A at the front of the members 55 whereas a plane in tangential relationship therewith at about the position of the rearmost rod or tube 57 is horizontally or substantially horizontally disposed.

FIG. 7 illustrates the use of an elongate soil working member 58 whose principal soil-contacting portion is carried at the front by a supporting bracket 59 and near the rear by a further parallel supporting bracket 60. The leading supporting bracket 59 is of substantially L-shaped cross-section while the rear supporting bracket 60 is of substantially channel-shaped cross-section, its limbs diverging by a few degrees saway from its web or base which lies rearmost with respect to the direction A. A plurality of elongate elements 60A are rigdily secured to the downwardly directed limb of the bracket 59 and to the lower limb of the bracket 60, each element comprising a leading portion which is inclined steeply downwardly and rearwardly with respect to the direction A away from the bracket 60 and a lower rear portion that is in parallel or substantially parallel relationship with the direction A. The elements 60A extend rearwardly with respect to the direction A behind the rear supporting bracket 60 and each of them may have any chosen one of a number of different constructions. For example, the elements 60A may be in the form of rods, tubes, bars of L-shaped cross-section or bars of channel-shaped cross-section. Any one of the four elongate soil working members 38, 54, 55 or 58 can be employed, the choice being dependent principally upon the nature and condition of the soil that is to be cultivated and the purpose for which that soil is intended after cultivation.

FIGS. 8 to 12 of the drawings illustrate an alterative form of soil cultivating implement or machine in accordance with the invention, said implement having two frame beams 61 and 62 which both extend substantially horizontally perpendicular to the direction A in parallel but spaced apart relationship. The ends of the two frame beams 61 and 62 are interconnected by substantially vertically disposed strips 63 that are parallel to one another and substantially parallel to the direction A. Each of the two beams 61 and 62 is of polygonal cross-section and preferably has the hollow formation and square cross-section that is illustrated. Each beam carries a corresponding row of cultivator tines 65, the leading row that corresponds to the beam 61 comprising six tines 65 and the rear row that corresponds to the beam 62 comprising seven tines 65 in the embodiment that is being described. As viewed from the rear in the direction A, the tines 65 of the leading row lie alternately midway between the tines 65 of the rear row. The cultivator tines 65 are identical in construction and mounting to the previously described tines 4 except that the lowermost ends of their soil working portions are provided with replaceable blades 66 of a different form to the blades 8. Each blade 66 comprises two upwardly and rearwardly divergent swept back wings 67. The two wings 67 of each blade extend in V-shaped relationship (see FIG. 8) and the general plane of each blade is inclined upwardly and rearwardly with respect to the direction A from the point of the "V" to the rearmost ends of the two wings 67 (see FIG. 9).

In addition to the end strips 63 of the implement frame, the frame beams 61 and 62 are interconnected by two further parallel strips 64 that are spaced apart from one another by equal distances from the midpoints of the two beams 61 and 62. The rearmost ends of the strips 63 with respect to the direction A are formed with downward extensions 68 to which the rearmost ends of corresponding arms 70 are pivotally connected by pins 69, the two pivot pins 69 being in coaxial relationship with one another. The upper edges of the arms 70 are formed with upwardly directed lugs 71 and each lug 71 has a hole through which can be entered a corresponding clamping bolt 72. The downward extensions 68 of the frame end strips 63 are formed with curved rows of holes 73, each hole 73 being at the same distance from the axis defined by the pivot pins 69 as is the hole in the closely neighbouring lug 71. It can be seen from FIG. 9 of the drawings that the holes 73 are spaced apart from one another vertically and that the arms 70 can be retained in chosen angular positions about the axis defined by the pivot pins 69 merely by bringing the holes in the lugs 71 into register with appropriate holes 73, entering the clamping bolts 72 through the aligned holes and tightening those bolts. Disregarding the lugs 71, the arms 70 are of increasing width between their upper and lower edges from the rearmost ends to the leading ends thereof with repect to the direction A. The leading ends of the arms 70 co-operate in rotatably carrying the opposite ends of a supporting member of the implement which member is in the form of the previously described roller 15. It is therefore not necessary to repeat a description of the roller 15.

Pairs of lugs 73A are mounted at/the front of the rear frame beam 62 at equal distances inwardly towards the midpoint of that frame beam from the opposite ends thereof. Each pair of lugs 73A has the lower end of a corresponding bracket 73C turnably connected to it by a horizontal pivot bolt 73B arranged at the upper ends of the lugs 73A concerned, said ends being at a higher horizontal level than is the top of the beam 62 (see FIGS. 11 and 12). The pivot bolt 73B co-operates with the limbs of the channel-shaped bracket 73C which limbs project forwardly from the web or base of the bracket with respect to the direction A. The rear surface of the web or base of each bracket 73C is welded or otherwise rigidly secured to the leading surface of the web or base of a corresponding second bracket 74 that is also of channel-shaped cross-section, the limbs of the bracket 74 projecting rearwardly from its web or base with respect to the direction A and having the shape that can be seen best in FIG. 11 of the drawings, said shape being such as to give the rear edge of each limb a rearwardly directed shallow V-shaped configuration. If preferred, instead of welding the webs or bases of the two brackets 73C and 74 of each pair to one another, said webs or bases may be interconnected by tie members that are not shown in the drawings. The forwardly directed limbs of each bracket 73C are formed with a plurality, such as three, of horizontally aligned pairs of vertically spaced apart holes 75 and any chosen pair of those holes 75 can have a pivot bolt 76 entered therethrough to connect the rearmost end of a corresponding arm 77 pivotably to the bracket 73C concerned. The leading ends of the two arms 77 with respect to the direction A are pivotally connected to respective pairs of lugs 79 mounted on top of the front frame beam 61 by respective pivot pins 78 which are in horizontally aligned relationship with one another.

The upper and lower ends of the two rearwardly directed limbs of each bracket 74 carry horizontally aligned bearings (see particularly FIG. 12) in which bearings are lodged upper and lower horizontal pivot shafts 80. Upper and lower arms 81 are turnable about the pivot shafts 80, between the limbs of the brackets 74, and project generally rearwardly from said brackets with respect to the direction A. The upper and lower arms 81 of each pair are of equal lengths and their rearmost ends are turnably connected by horizontal pivot shafts 81A to the limbs of upwardly extending supports 82 that are of channel-shaped cross-section. The limbs of the supports 82 project forwardly with respect to the direction A from their webs or bases and carry the shafts 81A by way of further horizontally aligned bearings. The brackets 74, supports 82 and interconnecting upper and lower arms 81 form parts of a dual pivotable linkage which in the embodiment that is being described, is a dual parallelogram linkage 82A. The lowermost ends of the two upwardly extending supports 82 are rigidly secured to the top of the previously described carrier 35, said carrier 35 being capable of being provided, as previously described, with any chosen one of the four elongate soil working members 38, 54, 55 or 58. FIGS. 8, 9 and 10 of the drawings actually show the elongate soil working member 55 that has previously been described with reference to FIG. 6 of the drawings in use as part of the implement of FIGS. 9 to 12.

A tie beam 83 (FIG. 10) interconnects locations that are close to the uppermost ends of the two supports 82 and a further tie beam 84 has its opposite ends secured to the top of the carrier 35 immediately alongside the lower ends of the respective supports 82. It will be apparent from FIG. 10 of the drawings that the upper tie beam 83 is not straight but comprises two obliquely downwardly directed longer outer portions and a short horizontally disposed central straight portion. The lower tie beam 84 is of similar configuration to the tie beam 83 except that the longer outer portions thereof make steeper angular junctions with the short horizontally disposed central portion than in the case of the beam 83. The two short horizontally disposed central portions are disposed immediately one above the other and are rigidly secured together, a mounting being provided, at this location, for a housing or gear box 85 in which two horizontally spaced apart shafts 86 and 87 that both extend substantially parallel to the direction A are rotatably journalled. The leading end of the shaft 87 with respect to the direction A projects forwardly from the front of the housing or gear box 85 and is there splined or otherwise keyed to enable it to be placed in driven connection with the rear power take-off shaft of an agricultural tractor or other operating vehicle through the intermediary of a telescopic transmission shaft 88, that is of a construction which is known per se, having universal joints at its opposite ends. The two shafts 86 and 87 are provided, inside the housing or gear box 85, with corresponding intermeshing pinions 89 that are both of the same size. Each of the two pinions 89 carries, or integrally includes, a corresponding eccentric weight 90 at one side of the axis of the respective shaft and is preferably, but not essentially, formed at the opposite side thereof with a plurality of holes that may be similar to the holes 44C that have been described with reference to FIGS. 3 and 4 of the drawings. FIGS. 8 and 10 of the drawings show the two pinions 89 in a position in which they are 180° out of phase with one another around the axes of the corresponding shafts 87 and 86 and it will be realised that the arrangement is similar to that which has been described above in being such as to impart substantially only a vertically orientated reciprocatory vibration to the housing or gear box 85 (and the parts that are fastened to that housing or gear box 85), the counterbalancing effect of the eccentric weights 90 being designed to greatly suppress, if not entirely eliminate, any horizontal component of the reciprocatory vibration. The rear of the housing or gear box 85 with respect to the direction A is closed by a removable cover that is usually secured in place by a bolt (not shown).

The upper arm 81 of each unit of the dual parallelogram linkage 82A is formed at some distance rearwardly from the respective upper pivot shaft 80 with an upwardly extending transverse hole (not visible), a rod 92 (FIGS. 11 and 12 being entered through said hole so as to project some distance both upwardly above the top of the arm 81 and downwardly beneath the bottom thereof. The uppermost and lowermost ends of each rod 92 are passed through holes in strips 93 which perpendicularly interconnect upper and lower regions of vertical plates 94. The plates 94 of each pair have the shapes that can be seen in FIG. 11 of the drawings and are turnable about the respective upper pivot shaft 80 between the rearwardly directed limbs of the corresponding bracket 74 but at opposite sides of the respective upper arm 81. Lower regions of each pair of plates 94 are formed with horizontal aligned holes and the flanking limbs of the respective brackets 74 are formed with curved rows of holes 96 which are all at the same distance from the axis of the upper pivot shaft 80 concerned as are the holes in said plates 94. Thus, the plates 94 are turnable about the upper pivot shafts 80 relative to the brackets 74 between the limbs of those brackets but horizontal locking pins 95 are provided for entry through the holes in the lower regions of the plates 94 and chosen holes 96 in the limbs of the brackets 74 so that, when the locking pins 95 are operatively engaged, the plates 94 will be retained in corresponding angular settings about the upper pivot shafts 80 relative to the brackets 74. The rods 92 are provided with stop rings above and below the respective upper and lower strips 93 and upper and lower helical compression springs 97 are wound around each rod 92, above and below the corresponding arm 81, so as to bear between plates contacting the upper and lower surface of that arm and the facing surfaces of the respective strips 93 (see FIG. 11). It will be apparent that, with this arrangement, the springs 97 tend to maintain the arms 81 in angular equilibrium positions about the upper and lower pivot shafts 80, said arms 81 being, however, angularly turnable upwardly and downwardly in response to operation of the eccentric mechanism of the implement against the action of the opposed springs 97 of each pair. The equilibrium position that has just been mentioned can be changed by causing the locking pins 95 to co-operate with different pairs of the holes 96.

The soil cultivating implement or machine of FIGS. 8 to 12 of the drawings operates in many respects in a manner that is analogous to the operation of the implement or machine of FIGS. 1 to 4 of the drawings. However, in this case, the rear row of the cultivator tines 65 is not movable upwardly and downwardly independently of the leading row as is possible for the cultivator tines 4 in the first embodiment, it being remembered that, in said embodiment, the rear row of cultivator tines 4 is caused to vibrate to some extend with the elongate soil working member 38, 54, 55 or 58. In the embodiment of FIGS. 8 to 12 of the drawings, the level of the rear elongate soil working member that is chosen (the member 55 being illustrated) relative to that of the frame of the implement is initially determined by the particular pairs of holes 75 in the limbs 73C of the brackets that are chosen for co-operation with the pivot bolts 76 at the rear ends of the arms 77. A subordinate and finer adjustment of this level can be effected by causing the locking pins 95 to co-operate with different holes 96 as described above. When the shaft 87 is driven from the rear power take-off shaft of the tractor or other operating vehicle through the intermediately of the known telescopic transmission shaft 88 during the operation of the machine, the rear elongate soil working member 55 or one of the other elongate soil working members is caused to perform a reciprocatory upward and downward motion that has a beneficial flattening and crumbling action upon lumbs of soil turned by the foregoing tines 65, there being very little, if any, horizontal component to the reciprocatory vibration so that the implement is not displaced laterally to any significant extend, the axes of rotation of the shafts 86 and 87 being in parallel or substantially parallel relationship with the direction A. The cultivator tines 65 of this embodiment have a somewhat larger area in displacing contact with the soil during operation because of the provision of the replaceable blades 66 with the rearwardly swept back wings 67.

Although various features of the soil cultivating implements or machines that have been described and/or that are illustrated in the accompanying drawings will be set forth in the following claims as inventive features, it is emphasised that the invention is not necessarily limited to those features and that it includes within its scope each of the parts of each soil cultivating implement or machine embodiment that has been described, and/or that is illustrated in the accompanying drawings, both individually and in various combinations.

What we claim is:

1. A soil cultivating implement comprising a frame with coupling means connectable to a prime mover, said frame having beam means extending transverse to the direction of travel and a plurality of cultivating tools mounted along the length of said beam means, a supporting roller positioned to the rear of at least some of said tools and said roller being linked to the frame with pivotable arms, setting means interconnecting said arms to the frame in any chosen one of a plurality of positions to vary the level of said frame relative to said roller, an elongated soil working member with supports and means linking said supports to said frame and said soil working member being positioned at the rear of said roller, at least one eccentric connecting said supports to driving means and said eccentric being driven to reciprocate the soil working member in substantially up and down movements during operation, said linking means comprising at least one resiliently mounted parallelogram linkage that interconnects said supports to the frame, the reciprocable movements of said soil working member being opposed by said linkage.

2. An implement as claimed in claim 1, wherein said tools comprise two rows of tines that are spaced apart and located one behind the other and said roller is located between said rows, said roller having an effective width that extends throughout the total working width of at least one of said rows.

3. An implement as claimed in claim 2, wherein said pivotable arms extend forwardly with respect to the direction of travel.

4. An implement as claimed in claim 3, wherein said arms comprise a dual parallelogram linkage coupling the roller to a front beam of the frame and said beam supports a leading row of tines.

5. An implement as claimed in claim 4, wherein said dual parallelogram linkage comprises lower arms provided with fasteners that retain those arms in chosen ones of different angular positions relative to said beam.

6. An implement as claimed in claim 2, wherein said arms are pivotable upwardly and downwardly relative to a rear beam of said frame, said rear beam mounting a rear row of tines, said arms being pivotable relative to said rear beam about an axis located behind the roller with respect to the direction of travel.

7. An implement as claimed in claim 6, wherein said setting means is located in advance of said pivotal axis with respect to the direction of travel.

8. An implement as claimed in claim 2, wherein the rear row of tines is connected to a pivoted frame part and said resiliently mounted parallelogram linkage is also connected to said pivoted frame part whereby reciprocable movements of said soil working member are at least partially transmitted to said frame part and tines whereby said rear row of tines performs reciprocatory vibrations during operation.

9. An implement as claimed in claim 1, wherein said resiliently mounted parallelogram linkage comprises at least one pair of vertically spaced parallel links and a spring mechanism positioned to bear on an upper link of the pair, to prevent excessive vertical movements of the working member.

10. An implement as claimed in claim 9, wherein said spring mechanism comprises two compression springs held between plates, said springs bearing against the top and the bottom of said upper link.

11. An implement as claimed in claim 10, wherein said plates are pivoted to said linkage and turnable upwardly and downwardly to compress or expand either spring, and means to fix said plates in a plurality of different positions.

12. An implement as claimed in claim 1, wherein said resiliently mounted parallelogram linkage comprises two substantially parallel leaf springs.

13. An implement as claimed in claim 1, wherein said supports extend upwardly and include adjustable means that varies the height of the working member relative to linkage.

14. An implement as claimed in claim 13, wherein said working member comprises a carrier and any chosen one of a plurality of different soil-contacting portions is selectively secured to said carrier.

15. An implement as claimed in claim 14, wherein one of said soil-contacting portions is sheet metal having a substantially flat soil-contacting bottom that is bent over upwardly at its front and rear to form portions releasably secured to said carrier.

16. An implement as claimed in claim 15, wherein said bottom has three ribs that are spaced apart from one another in the direction of travel.

17. An implement as claimed in claim 16, wherein said ribs define a substantially saw-toothed side profile.

18. An implement as claimed in claim 15, wherein the front of said soil-contacting portion has substantially twice the vertical extent of the rear thereof.

19. An implement as claimed in claim 14, wherein the soil-contacting portion comprises a plurality of spaced apart elongate elements that extend substantially perpendicular to the direction of travel.

20. An implement as claimed in claim 19, wherein said elements are carried by support plates and an imaginary surface containing the longitudinal axes of all of said elements extends upwardly and forwardly from the rear to the front of the soil working member.

21. An implement as claimed in claim 20, wherein said imaginary surface is cylindrically curved in configuration.

22. An implement as claimed in claim 20, wherein said elements are spaced apart from one another by substantially regular intervals.

23. An implement as claimed in claim 22, wherein said elements are substantially circular in cross-section.

24. A soil cultivating implement comprising a frame with coupling means connectable to a prime mover, said frame having beam means extending transverse to the direction of travel and at least one row of cultivating tools mounted along the length of said beam means, a supporting roller member being linked to the frame with pivotable arms and setting means interconnecting those arms to the frame in any chosen one of a plurality of positions, an elongated soil working member being interconnected to said frame at the rear of said supporting member, eccentric means interconnecting the soil working member with driving means and said eccentric means being connected to reciprocate the working member only in substantially up and down movements during operation, said working member having upwardly extending supports and a drive transmission of the driving means that comprises two eccentric mechanisms connected to respective supports, said mechanisms being located at the opposite ends of a transverse dirve shaft.

25. A soil cultivating implement comprising a frame with coupling means connectable to a prime mover, said frame having beam means extending transverse to the direction of travel and a plurality of cultivating tines mounted along the length of a beam of said beam means in a row, a supporting roller being connected to the frame with pivotable arms, setting means interconnecting said arms to the frame in any chosen one of a plurality of positions to vary the level of said roller relative to said frame, an elongated soil working member with supports being resiliently interconnected to said beam and positioned at the rear of said roller and said beam, said beam being pivoted to the remainder of the frame by pivot means and eccentric means connecting the soil working member to driving means, said eccentric being driven to reciprocate the soil working member together with beam and tines in substantially up and down movements about a common axis during operation.

26. An implement as claimed in claim 25, wherein there are two rows of tines mounted on respective beams positioned one behind the other, said common axis being located in advance of the leading row of tines.

27. An implement as claimed in claim 26, wherein said working member and the rear row of tines are carried by two spaced apart arms of said pivot means.

28. A soil cultivating implement comprising a frame with forward coupling means connectable to a prime mover, said frame having two spaced apart beams that extend horizontally transverse to the direction of travel, a first row of tines being fixed to a leading beam and a second row of tines being fixed to a rear beam, a reciprocable soil working member being linked to said rear beam and positioned to the rear of said second row of tines by parallelogram linkages, driving means engaging said soil working member, said soil working member having upwardly extending supports and at least one eccentric mechanism of said driving means being interconnected to said supports to reciprocate the soil working member in up and down movements, said working member having an elongated bottom that bears on the surface of the ground and crumbles the soil worked by said tines, adjusting means interconnecting said linkages with the frame and the working level of said soil working member being vertically adjustable relative to the frame by said adjusting means.

* * * * *